(12) United States Patent
Agrawal et al.

(10) Patent No.: US 12,035,036 B2
(45) Date of Patent: Jul. 9, 2024

(54) SYSTEM AND METHOD TO MANAGE MULTI-MODE CAMERA PREVIEWS ON AN IMAGE-RECEIVING DEVICE

(71) Applicant: MOTOROLA MOBILITY LLC, Chicago, IL (US)

(72) Inventors: Amit Kumar Agrawal, Bangalore (IN); Rahul B. Desai, Hoffman Estates, IL (US); Boby Iyer, Elmhurst, IL (US); Fabio Felipe Mira Machuca, Sao Paulo (BR)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 17/103,497

(22) Filed: Nov. 24, 2020

(65) Prior Publication Data
US 2022/0166933 A1    May 26, 2022

(51) Int. Cl.
*H04N 23/63* (2023.01)
*G06F 3/04842* (2022.01)
*H04N 1/00* (2006.01)
*H04N 23/661* (2023.01)
*H04N 23/667* (2023.01)
*H04N 101/00* (2006.01)

(52) U.S. Cl.
CPC ....... *H04N 23/632* (2023.01); *G06F 3/04842* (2013.01); *H04N 1/0044* (2013.01); *H04N 23/661* (2023.01); *H04N 23/667* (2023.01); *H04N 2101/00* (2013.01); *H04N 2201/0015* (2013.01); *H04N 2201/0058* (2013.01); *H04N 2201/007* (2013.01)

(58) Field of Classification Search
CPC .... H04N 23/632; H04N 23/667; H04N 23/66; H04N 23/661; H04N 23/662
See application file for complete search history.

(56) References Cited

U.S. PATENT DOCUMENTS

| | | |
|---|---|---|
| 8,233,026 B2 | 7/2012 | Sylvain |
| 8,937,677 B2 | 1/2015 | Lee |
| 8,988,558 B2 | 3/2015 | Chong et al. |

(Continued)

*Primary Examiner* — Twyler L Haskins
*Assistant Examiner* — Wesley J Chiu
(74) *Attorney, Agent, or Firm* — Isidore PLLC

(57) ABSTRACT

A communication device, method and computer program product provide multiple simultaneous camera previews of different imaging modes of the same image. The communication device includes a communication subsystem that receives a photographic image stream from a second communication device. The communication device includes a display driver that presents content on a display device. A controller of the communication device is communicatively coupled to the display driver. The controller simultaneously presents the more than one camera previews on the display device. The communication device presents a particular imaging mode of the photographic image stream corresponding to the particular camera preview that is user selected. The communication device transmits, via the communication subsystem to the second communication device, a report of a user selection by the at least one user input device, of the particular imaging mode of the photographic visual stream that is being presented on the display device.

17 Claims, 10 Drawing Sheets

(56) References Cited

U.S. PATENT DOCUMENTS

| | | | |
|---|---|---|---|
| 9,742,978 B2 | 8/2017 | Ito et al. | |
| 10,200,597 B2 | 2/2019 | Choi et al. | |
| 10,742,876 B2 | 8/2020 | Tanaka et al. | |
| 11,082,600 B2 | 8/2021 | Tokunaga | |
| 11,256,461 B2 | 2/2022 | Jo et al. | |
| 11,372,530 B2 | 6/2022 | Dey et al. | |
| 11,496,662 B2 | 11/2022 | Fukiage et al. | |
| 2010/0157016 A1* | 6/2010 | Sylvain | H04N 19/36 |
| | | | 348/E7.083 |
| 2011/0187914 A1* | 8/2011 | Lee | H04N 5/222 |
| | | | 348/333.11 |
| 2012/0274808 A1* | 11/2012 | Chong | H04N 5/2258 |
| | | | 348/E9.053 |
| 2014/0204244 A1* | 7/2014 | Choi | H04N 5/23222 |
| | | | 348/231.99 |
| 2016/0219210 A1* | 7/2016 | Ito | H04N 5/23216 |
| 2018/0246634 A1* | 8/2018 | Suh | G06F 3/0488 |
| 2019/0087076 A1* | 3/2019 | Dey | G06F 3/0485 |
| 2019/0273861 A1* | 9/2019 | Tanaka | H04N 5/23293 |
| 2019/0327406 A1* | 10/2019 | Tokunaga | G06F 3/04847 |
| 2020/0057589 A1 | 2/2020 | Jo et al. | |
| 2020/0099847 A1* | 3/2020 | Fukiage | H04N 5/232945 |
| 2022/0303450 A1* | 9/2022 | Lee | H04N 23/80 |

* cited by examiner

SYSTEM AND METHOD TO MANAGE MULTI-MODE CAMERA PREVIEWS ON AN IMAGE-RECEIVING DEVICE

1. TECHNICAL FIELD

The present disclosure relates generally to communication devices that have a display, and more particularly to communication devices that present a preview of a received image on the display.

2. DESCRIPTION OF THE RELATED ART

Multipurpose electronic devices such as laptops, smartphones, and tablets include front and/or back cameras that serve as image capturing devices. The cameras can be electronically and optically enhanced for various imaging modes such as zoom, macro, panoramic, high resolution, low light, and high-speed live filters. Some of these imaging modes can be achieved wholly or in part by downstream image processing. For example, cropping of the image can be used to provide a portrait, square, or landscape orientation in various aspect ratios. As another example, the image processing can include a beauty mode that applies low pass filtering to hide blemishes. As an additional example, a spot color mode can leave a selected color and convert other colors to black and white.

Upon activating the camera, the electronic device presents, on a display of the electronic device, a camera preview using a default imaging mode. To enable selection of an imaging mode, control options are presented to enable switching the camera preview to another imaging mode. The user can sequentially select various other imaging modes until deciding upon a particular imaging mode for recording or streaming the image. Conventional devices limit the camera preview to one imaging mode at a time, which is appropriate for presentation on small handheld user devices.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
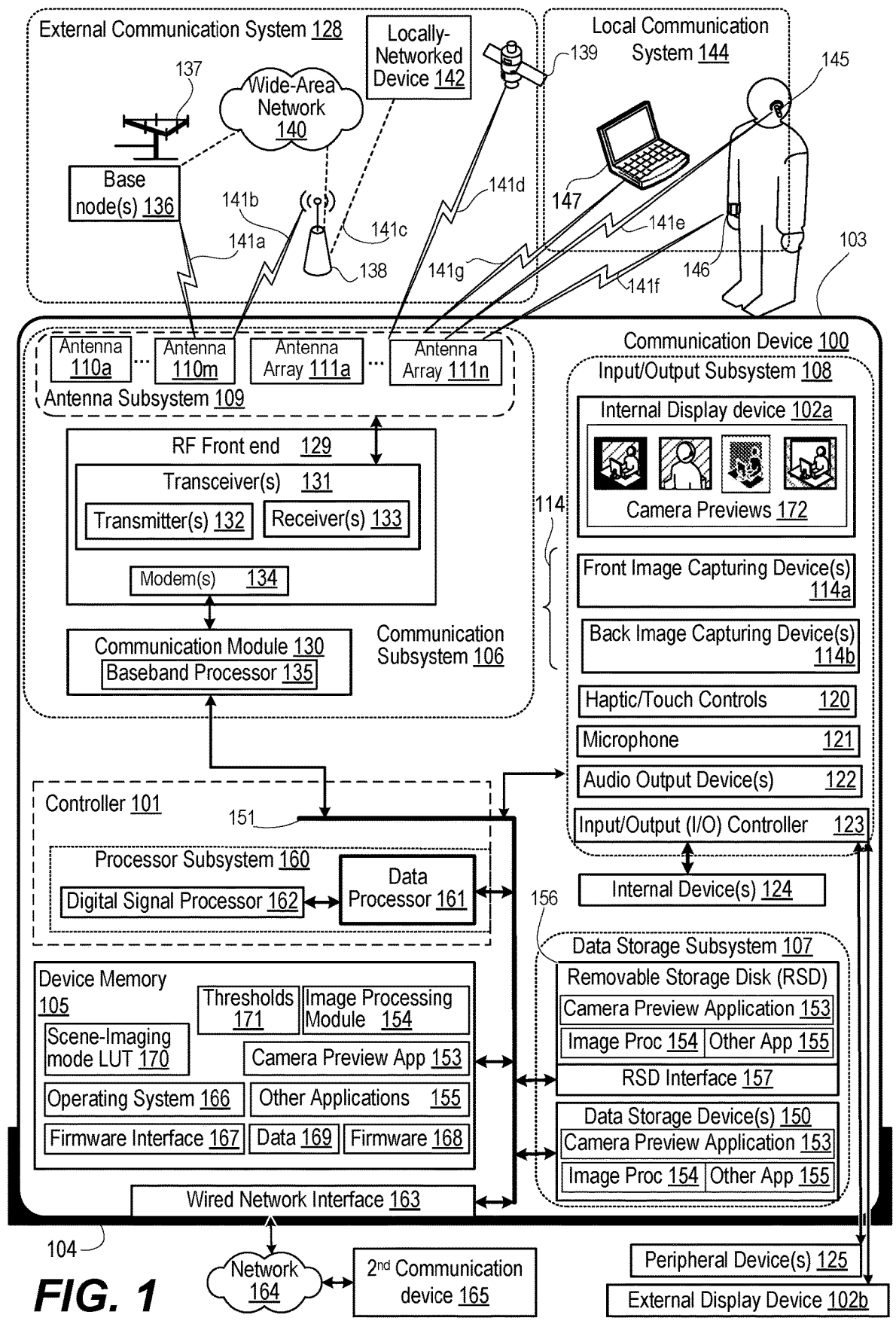
FIG. 1 depicts a functional block diagram of a communication device that operates in a communication environment and within which the features of the present disclosure are advantageously implemented, according to one or more embodiments.

According to aspects of the present disclosure, a communication device, computer program product, and method enable a user of the communication device to compare multiple camera previews prior to presenting a photographic image stream. The communication device receives, via a communication subsystem, at least one photographic visual stream from a second communication device. The communication device simultaneously presents on a display device of the first communication device more than one camera previews of the at least one photographic visual stream in different imaging modes. The communication device enables user selection of a particular camera preview from among the more than one camera previews. In response to receipt of a user selection of the particular camera preview, the communication device presents a particular imaging mode of the photographic image stream corresponding to the particular camera preview. The communication device transmits a report, via the communication subsystem, to the second communication device. The report contains a user selection by the at least one user input device, of the particular imaging mode of the photographic visual stream that is being presented on the display device.

In the following detailed description of embodiments of the disclosure, specific embodiments in which the various aspects of the disclosure may be practiced are described in sufficient detail to enable those skilled in the art to practice the invention, and it is to be understood that other embodiments may be utilized and that logical, architectural, programmatic, mechanical, electrical, and other changes may be made without departing from the spirit or scope of the present disclosure. The following detailed description is, therefore, not to be taken in a limiting sense, and the scope of the present disclosure is defined by the appended claims and equivalents thereof. Within the descriptions of the different views of the figures, similar elements are provided similar names and reference numerals as those of the previous figure(s). The specific numerals assigned to the elements are provided solely to aid in the description and are not meant to imply any limitations (structural or functional or otherwise) on the described embodiment. It will be appreciated that for simplicity and clarity of illustration, elements illustrated in the figures have not necessarily been drawn to scale. For example, the dimensions of some of the elements are exaggerated relative to other elements.

It is understood that the use of specific component, device and/or parameter names, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

As further described below, implementation of the functional features of the disclosure described herein is provided within processing devices and/or structures and can involve use of a combination of hardware, firmware, as well as several software-level constructs (e.g., program code and/or program instructions and/or pseudo-code) that execute to provide a specific utility for the device or a specific functional logic. The presented figures illustrate both hardware components and software and/or logic components.

Those of ordinary skill in the art will appreciate that the hardware components and basic configurations depicted in the figures may vary. The illustrative components are not intended to be exhaustive, but rather are representative to highlight essential components that are utilized to implement aspects of the described embodiments. For example, other devices/components may be used in addition to or in place of the hardware and/or firmware depicted. The depicted example is not meant to imply architectural or other limitations with respect to the presently described embodiments and/or the general invention. The description of the illustrative embodiments can be read in conjunction with the accompanying figures. Embodiments incorporating teachings of the present disclosure are shown and described with respect to the figures presented herein.

FIG. 1 is a functional block diagram of an electronic device, and more particularly communication device 100, which is managed by controller 101, in an operating environment within which the features of the present disclosure are advantageously implemented. According to one aspect, communication device 100 includes internal display device 102*a* of a size sufficient to support aspects of the present disclosure. According to one aspect, communication device 100 is a portable, mobile, or hand-held device having housing 103 that can be positioned for stationary use in a dock 104 next to an external display device 102*b*. In one or more embodiments, external display device 102*b* is a television or display monitor. In one or more embodiments, external display device 102*b* is a display of a communicatively connected communication device. Communication device 100 can be one of a host of different types of devices, including but not limited to, a mobile cellular phone, satellite phone, or smart-phone, a laptop, a net-book, an ultra-book, a networked smart watch or networked sports/exercise watch, and/or a tablet computing device or similar device that can include wireless and/or wired communication functionality. As an electronic device supporting wireless communication, communication device 100 can be utilized as, and also be referred to as, a system, device, subscriber unit, subscriber station, mobile station (MS), mobile, mobile device, remote station, remote terminal, user terminal, terminal, user agent, user device, a Session Initiation Protocol (SIP) phone, a wireless local loop (WLL) station, a personal digital assistant (PDA), computer workstation, a handheld device having wireless connection capability, a computing device, or other processing devices connected to a wireless modem.

Referring now to the specific component makeup and the associated functionality of the presented components. In one or more embodiments, communication device 100 includes device memory 105, communication subsystem 106, data storage subsystem 107, and input/output (I/O) subsystem 108. Device memory 105 and each subsystem (106, 107, and 108) are managed by controller 101. Communication subsystem 106 includes antenna subsystem 109 having lower band antennas 110*a*-110*m* and higher band antenna arrays 111*a*-111*n* that can be attached in different portions of housing 103. I/O subsystem 108 includes image capturing device(s) 114, such as front and back image capturing devices 114*a*-114*b*. I/O subsystem 108 includes user interface devices such as internal display device 102*a*, touch/haptic controls 120, microphone 121, and audio output device(s) 122. I/O subsystem 108 also includes I/O controller 123. I/O controller 123 connects to internal devices 124, which are internal to housing 103 and to peripheral devices 125, such as external speakers, which are external to housing 103 of communication device 100. Examples of internal devices 124 are computing, storage, communication, or sensing components depicted within housing 103. I/O controller 123 supports the necessary configuration of connectors, electrical power, communication protocols, and data buffering to interface internal devices 124 and peripheral devices 125 such as external display device 102*b* to other components of communication device 100 that use a different configuration for inputs and outputs. In one or more embodiments, I/O controller 123 supports a wired display interface cable connection between audiovisual generating devices and audiovisual presenting devices. An example of wired display interface cable connection is a high-definition multimedia interface (HDMI) cable.

Communication subsystem 106 of communication device 100 enables wireless communication with external communication system 128. Communication subsystem 106 includes radio frequency (RF) front end 129 and communication module 130. RF front end 129 includes transceiver(s) 131, which includes transmitter(s) 132 and receiver(s) 133. RF front end 129 further includes modem(s) 134. Communication module 130 of communication subsystem 106 includes baseband processor 135. Baseband processor 135 communicates with controller 101 and RF front end 129. Baseband processor 135 operates in baseband frequency range to encode data for transmission and decode received data, according to a communication protocol. Modem(s) 134 modulate baseband encoded data from communication module 130 onto a carrier signal to provide a transmit signal that is amplified by transmitter(s) 132. Modem(s) 134 demodulates each signal received from external communication system 128 detected by antenna subsystem 109. The received signal is amplified and filtered by receiver(s) 133, which demodulate received encoded data from a received carrier signal.

In one or more embodiments, controller 101, via communication subsystem 106, performs multiple types of over-the-air (OTA) or wireless communication with external communication system 128. External communication system 128 can include devices such as base node(s) 136 that can be elevated on respective radio tower(s) 137, access node(s) 138, and global positioning system (GPS) satellites 139. Some of these devices can be communicatively coupled to at least one wide area network 140. Communication subsystem 106 communicates via OTA communication channel(s) 141*a* with base node 136. Communication subsystem 106 communicates via wireless communication channel(s) 141*b* with access node 138. In one or more particular embodiments, access node 138 supports communication using one or more IEEE 802.11 wireless local area network (WLAN) protocols. Access node 138 is connected to wide area network 140, such as the Internet. In one or more particular embodiments, communication subsystem 106 communicates with one or more locally networked devices 142 via wired or wireless link 141*c* provided by access node 138. Communication subsystem 106 receives downlink broadcast channel(s) 141*d* from GPS satellites 139 to obtain geospatial location information.

In one or more embodiments, controller 101, via communication subsystem 106, performs multiple types of over-the-air (OTA) or wireless communication with local communication system 144. In one or more embodiments, local communication system 144 includes wireless headset 145 and smart watch 146 that are coupled to communication device 100 to form a personal access network (PAN). Communication subsystem 106 communicates via low power wireless communication channel(s) 141*e* with headset 145. Communication subsystem 106 communicates via second low power wireless communication channel(s) 141*f*, such as Bluetooth, with smart watch 146. In one or more particular embodiments, communication subsystem 106 communicates with other communication device(s) 147 via wireless link 141*g* to form an ad hoc network.

Data storage subsystem 107 of communication device 100 includes data storage device(s) 150. Controller 101 is communicatively connected, via system interlink 151, to data storage device(s) 150. Data storage subsystem 107 provides nonvolatile storage that is accessible by controller 101. For example, data storage subsystem 107 can provide a selection of program code and applications such as camera preview application 153, image processing module 154, and other application(s) 155 that can be loaded into device memory 105. In one or more embodiments, data storage device(s) 150 can include hard disk drives (HDDs), optical disk drives, and/or solid-state drives (SSDs), etc. Data storage subsystem 107 of communication device 100 can include removable storage device(s) (RSD(s)) 156, which is received in RSD interface 157. Controller 101 is communicatively connected to RSD 156, via system interlink 151 and RSD interface 157. In one or more embodiments, RSD 156 is a non-transitory computer program product or computer readable storage device. Controller 101 can access RSD 156 or data storage device(s) 150 to provision communication device 100 with program code, such as camera preview application 153 and other applications 155. When executed by controller 101, the program code causes or configures communication device 100 to provide the functionality described herein.

Controller 101 includes processor subsystem 160, which includes one or more central processing units (CPUs), depicted as data processor 161. Processor subsystem 160 can include one or more digital signal processors 162 that are integrated with data processor 161 or are communicatively coupled to data processor 161, such as baseband processor 135. In one or embodiments that are not depicted, controller 101 can further include distributed processing and control components that are peripheral or remote to housing 103 or grouped with other components, such as I/O subsystem 108. Data processor 161 is communicatively coupled, via system interlink 151, to device memory 105. In one or more embodiments, controller 101 of communication device 100 is communicatively coupled via system interlink 151 to communication subsystem 106, data storage subsystem 107, and input/output subsystem 108. System interlink 151 represents internal components that facilitate internal communication by way of one or more shared or dedicated internal communication links, such as internal serial or parallel buses. As utilized herein, the term "communicatively coupled" means that information signals are transmissible through various interconnections, including wired and/or wireless links, between the components. The interconnections between the components can be direct interconnections that include conductive transmission media or may be indirect interconnections that include one or more intermediate electrical components. Although certain direct interconnections (interlink 151) are illustrated in FIG. 1, it is to be understood that more, fewer, or different interconnections may be present in other embodiments. In one or more embodiments, wired network interface 163 provides an external wired connection to network 164. Network 164 can include a local area network (LAN), campus area network (CAN), metropolitan area network (MAN), and/or wide area network (WAN). Wired network interface 163 is connected to interlink 151. Second communication devices 165 are connected to network 164. Controller 101 and other functional components of communication device 100 can communicate via wired network interface 163 with second communication devices 165. Communication device 100 can be communicatively coupled to second communication devices 165 via wired network interface 163. In one or more embodiments, wired network interface 163 supports a wired communication cable connection between mobile or desktop communication devices.

Controller 101 manages, and in some instances directly controls, the various functions and/or operations of communication device 100. These functions and/or operations include, but are not limited to including, application data processing, communication with other communication devices, navigation tasks, image processing, and signal processing. In one or more alternate embodiments, communication device 100 may use hardware component equivalents for application data processing and signal processing. For example, communication device 100 may use special purpose hardware, dedicated processors, general purpose computers, microprocessor-based computers, micro-controllers, optical computers, analog computers, dedicated processors and/or dedicated hard-wired logic.

Device memory 105 includes program code and applications such as camera preview application 153, image processing module 154, and other application(s) 155. Device memory 105 further includes operating system (OS) 166, firmware interface 167, such as basic input/output system (BIOS) or Uniform Extensible Firmware Interface (UEFI), and firmware 168. Device memory 105 includes data 169 used by camera preview application 153 such as scene-image mode lookup table (LUT) 170 and threshold data 171. Processor subsystem 160 of controller 101 executes program code to provide operating functionality of communication device 100. The software and/or firmware modules have varying functionality when their corresponding program code is executed by processor subsystem 160 or secondary processing devices within communication device 100. Processor subsystem 160 of controller 101 can execute program code of camera preview application 153 to present camera previews 172 on internal display device 102*a* that improve user experience in image mode selection and use.

Figure 2:
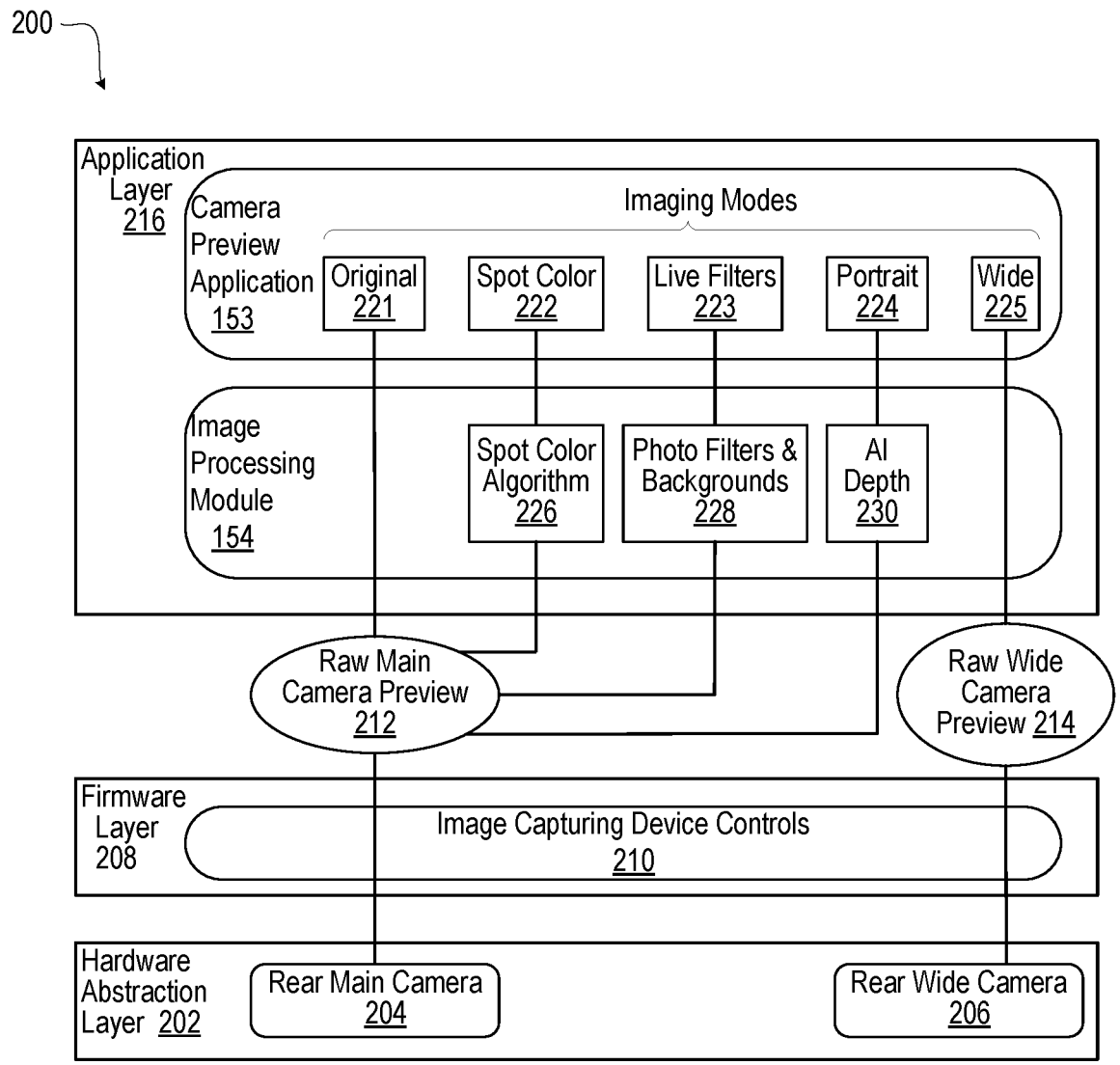
FIG. 2 depicts example software layer implementation that integrates software functionality for multiple camera preview of an image, according to one or more embodiments.

FIG. 2 depicts example software layer implementation 200 that integrates software functionality for multiple camera previews, according to aspects of the present disclosure. At a fundamental hardware abstraction layer 202, each available camera is represented, such as rear main camera 204 and rear wide camera 206. Firmware layer 208 includes image capturing device controls 210. Image capturing device controls 210 facilitate generation of raw main camera preview 212 by rear main camera 204 and raw wide camera preview 214 by rear wide camera 206. Application layer 216 includes image processing module 154 and camera preview application 153. Image processing module 154 provides imaging modes 221-225 to camera preview application 153. Original imaging mode 221 is raw main camera preview 212 without image processing. Spot color algorithm 226 of image processing module 154 alters raw main camera preview 212 to provide spot color imaging mode 222. Photo filters and backgrounds component 228 of image processing module 154 alters raw main camera preview 212 to provide live filters imaging mode 223. Artificial intelligence (AI) depth processor 230 blurs a background of raw main camera preview 212 to provide portrait imaging mode 224. Wide imaging mode 225 is raw wide camera preview 214 without image processing. For clarity, two cameras (204, 206) and five imaging modes (221-225) are depicted; however, other numbers and types of cameras can be used with additional or different combinations of imaging modes generated. An example of an additional camera is a front camera. For example, a front display of a mobile communication device (100) can be used as primary display or secondary display in conjunction with use of the front camera.

Figure 3A:
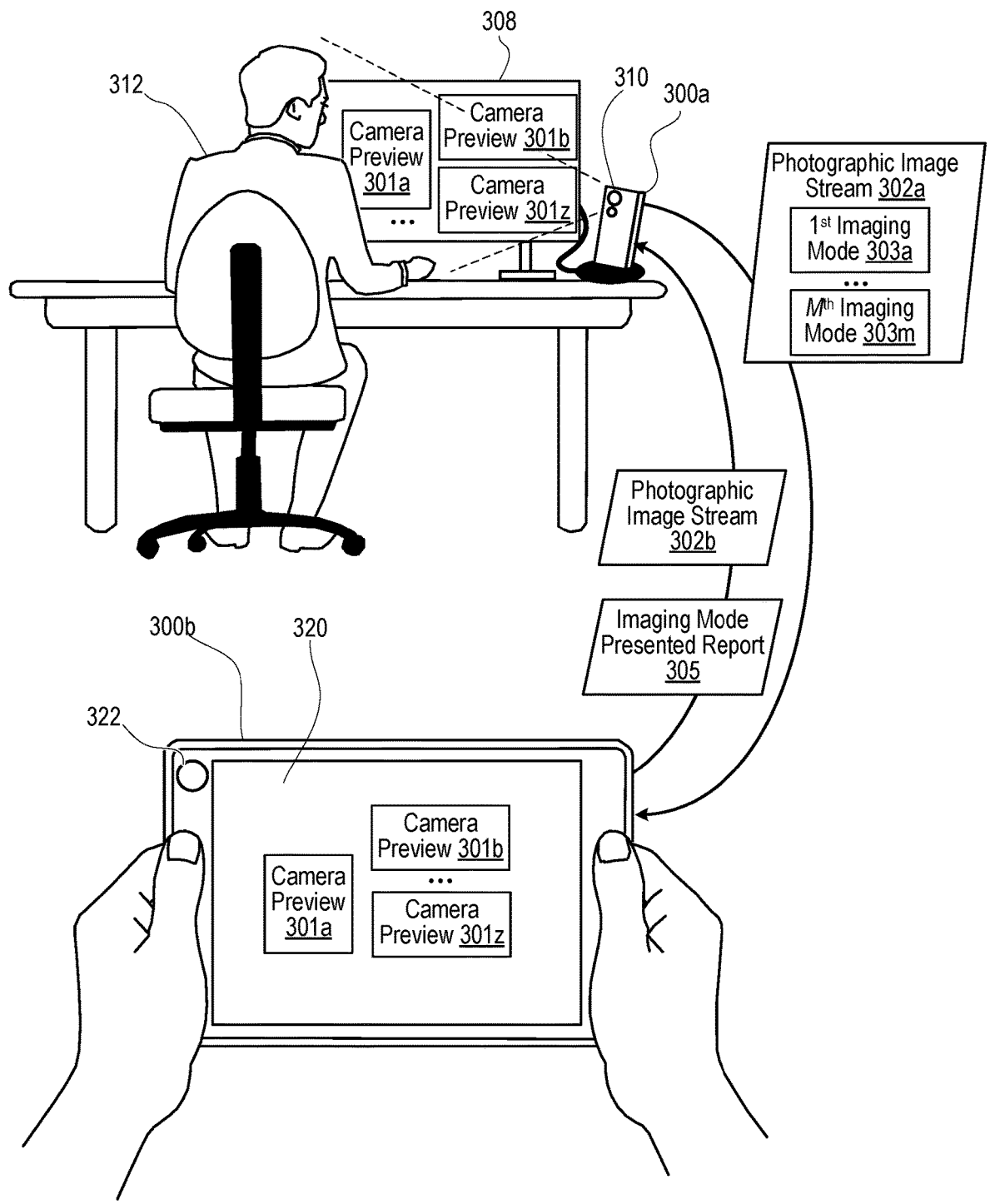
FIG. 3A is a communication flow diagram with two communication devices that are utilizing multiple simultaneous camera previews to support a video communication session, according to one or more embodiments.

FIG. 3A is a communication diagram depicting first and second communication devices 300a-300b that are utilizing multiple simultaneous camera previews. Each communication device 300a, 300b is an example of communication device 100 (FIG. 1) and can have identical or similar components as previously described. Each communication device 300a, 300b can act as an image origination source, using multiple simultaneous camera previews 301a-301z to enable a user to select an imaging mode for recording and/or for streaming to the other communication device 300a, 300b. In one or more embodiments, each communication device 300a, 300b can transmit respective photograph image stream 302a-302b containing more than one imaging mode 303a-303m to the other communication device 300a, 300b. Each communication device 300a, 300b can then use multiple camera previews 301a-301z to enable a user to select an imaging mode for presenting received photographic image stream 302 received from the other communication device 300a, 300b. In one or more embodiments, one communication device 300a, 300b transmits back to the other communication device 300a, 300b an image mode presented report 305 that indicates the selected imaging mode 303a-303m.

Figure 3B:
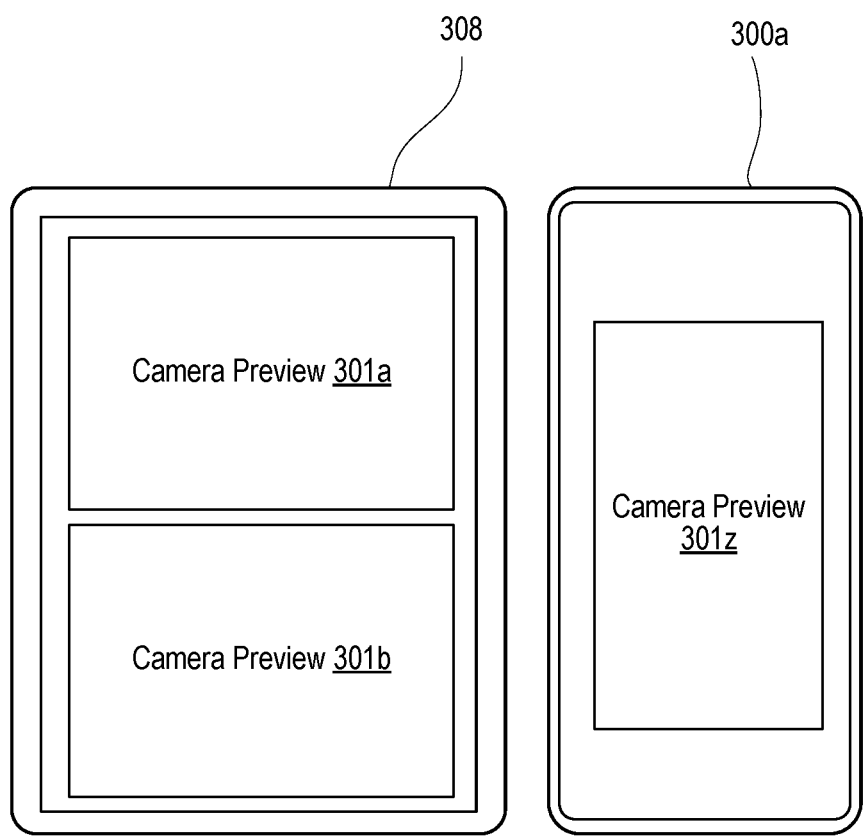
FIG. 3B is a front view of an example communication device and external display that together simultaneously present multiple camera previews, according to one or more embodiments.

In one or more embodiments, first communication device 300a is a mobile communication device that includes a display that is not sufficient for multiple simultaneous camera previews. The mobile communication is augmented by connection to external display 308. The size of external display 308 enables simultaneous presentation of multiple camera previews 301a-301z. In one or more embodiments, neither the first communication device 300a nor external display 308 includes a display of sufficient size to allow for simultaneous presentation of multiple camera previews 301a-301z; However, according to an alternate embodiment illustrated by FIG. 3B, simultaneous use of display capabilities of the combination of both first communication device 300a and external display 308 is sufficient for multiple simultaneous camera previews 301a-301z. With particular reference to FIG. 3A, first communication device 300a includes cameras 310 that can be oriented toward user 312 (of first communication device 300a) who is viewing external display 308. In one or more embodiments, presentation of multiple simultaneous camera previews 301a-301z is based in part on detecting both (i) a stationary orientation of first communication device 300a and (ii) connection of first communication device 300a to external display 308. The connection between first communication device 300a and external display 308 can be wired or wireless. The external display 308 can be a display monitor or another communication device that is powered on and functional. In one or more embodiments, neither the first communication device 300a nor external display 308 includes a display of sufficient size, but simultaneous use of display capabilities of the combination of both first communication device 300a and external display 308 is sufficient for multiple simultaneous camera preview.

In the illustrative embodiment, second communication device 300b includes an internal display device 320 that is large enough for simultaneous presentation of multiple camera previews 301a-301z. In one or more embodiments, the available size of the internal display device 320 is achieved by unfolding/opening the internal display device 320. In one or more embodiments, camera 322 of second communication device 300b is used to create camera previews 301a-301z when second communication device 300b is stationary or is moving.

Figure 4:
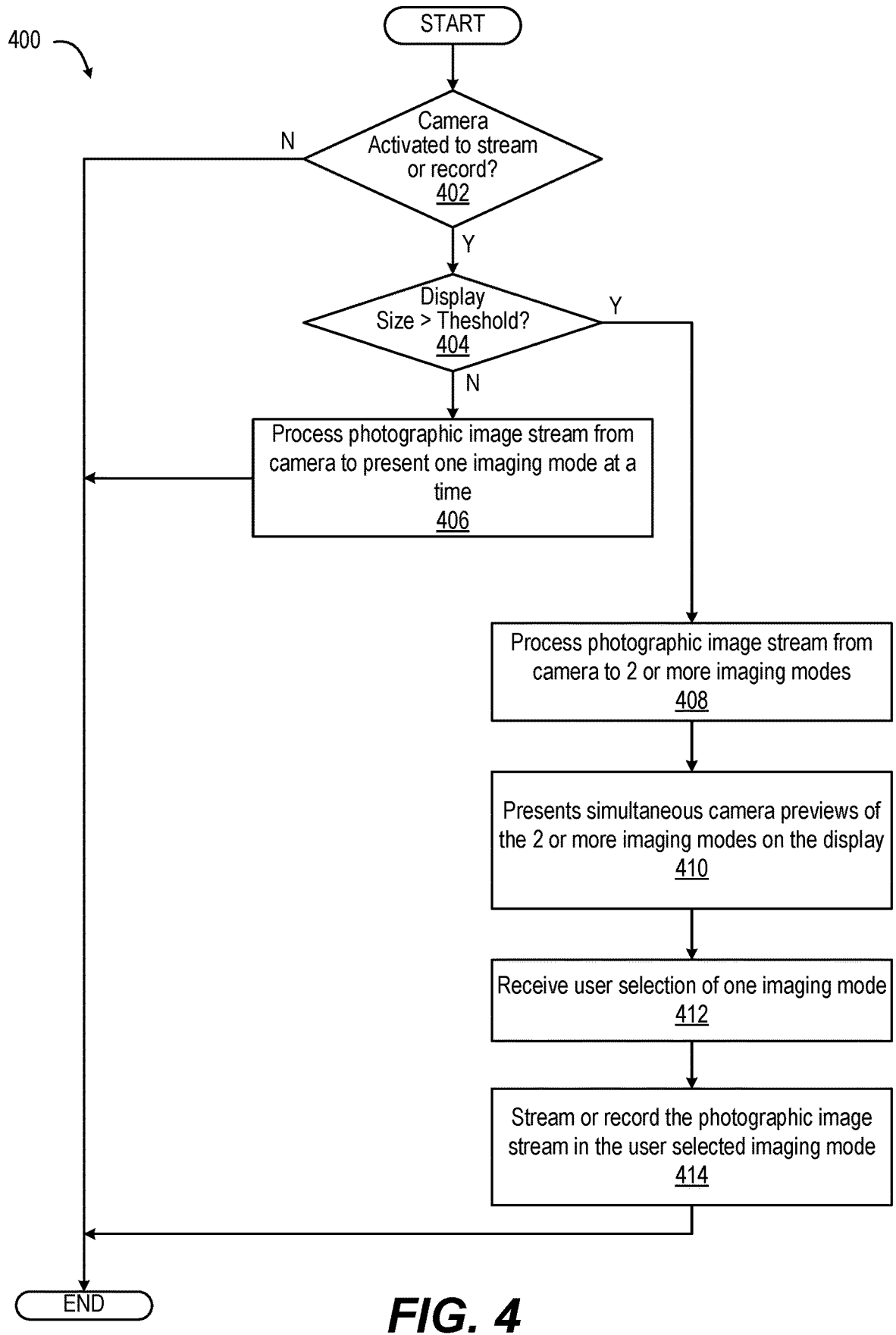
FIG. 4 presents a flow diagram of a method for simultaneous presentation of multiple camera previews, according to one or more embodiments.

FIG. 4 presents a flow diagram of method 400 for simultaneous presentation of multiple camera previews. The description of method 400 is provided with general reference to the specific components illustrated within the preceding FIGS. 1-3B. In at least one embodiment, communication device 100, managed by controller 101, performs method 400 by being communicatively coupled to image capturing devices 114 and at least one of internal and external display devices 102a, 102b (FIG. 1). Controller 101 executes camera preview application 153 and image processing module 154 (FIG. 1) to provide functionality of method 400. Specific components described in method 400 can be identical or similar to specific components of the same name used to describe preceding FIGS. 1-3B.

Method 400 begins at start block and includes detecting (at block 402) that at least one camera is activated to stream or record. In response to detecting that at least one camera is activated to stream or record, method 400 includes determining whether the display size is greater than a threshold, indicating sufficient size for presenting multiple simultaneous camera previews (decision block 404). In response to determining that the display size is less than or equal to the threshold, method 400 includes processing a photographic image stream from a camera to present one imaging mode at a time (block 406). Then method 400 ends. In response to determining that the display size is greater than the threshold, method 400 includes processing the image stream into two or more imaging modes (block 408). Method 400 includes presenting multiple simultaneous camera previews of the two or more imaging modes on the display (block 410). Method 400 includes receiving a user selection of one imaging mode (block 412). Method 400 includes streaming or recording the photographic image stream in the user selected imaging mode (block 414). Then method 400 ends.

Figure 5A:
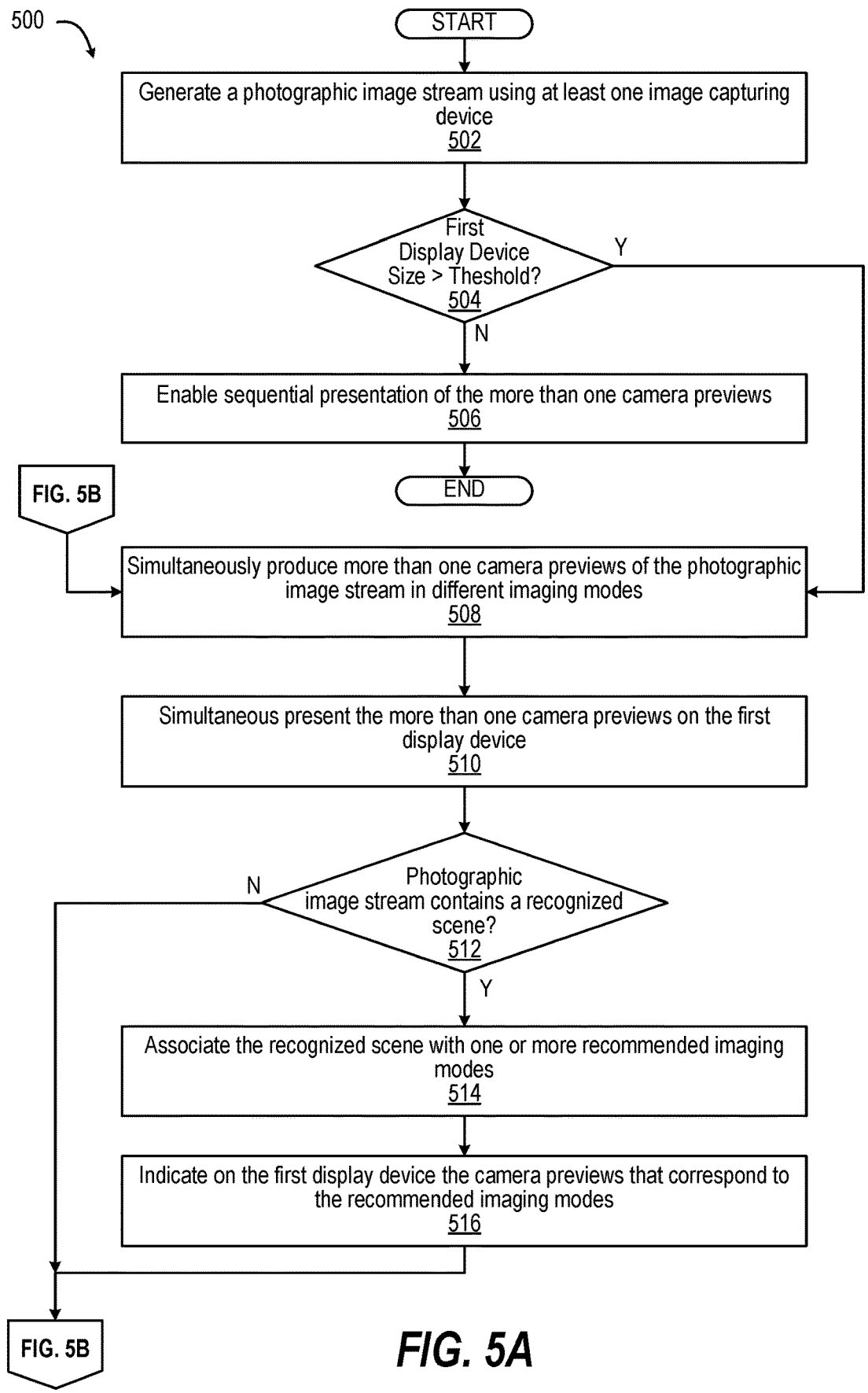
FIGS. 5A-5C (FIG. 5) present a flow diagram of a method for simultaneous presentation of multiple camera previews for originating an image stream, according to one or more embodiments.
Figure 5B:
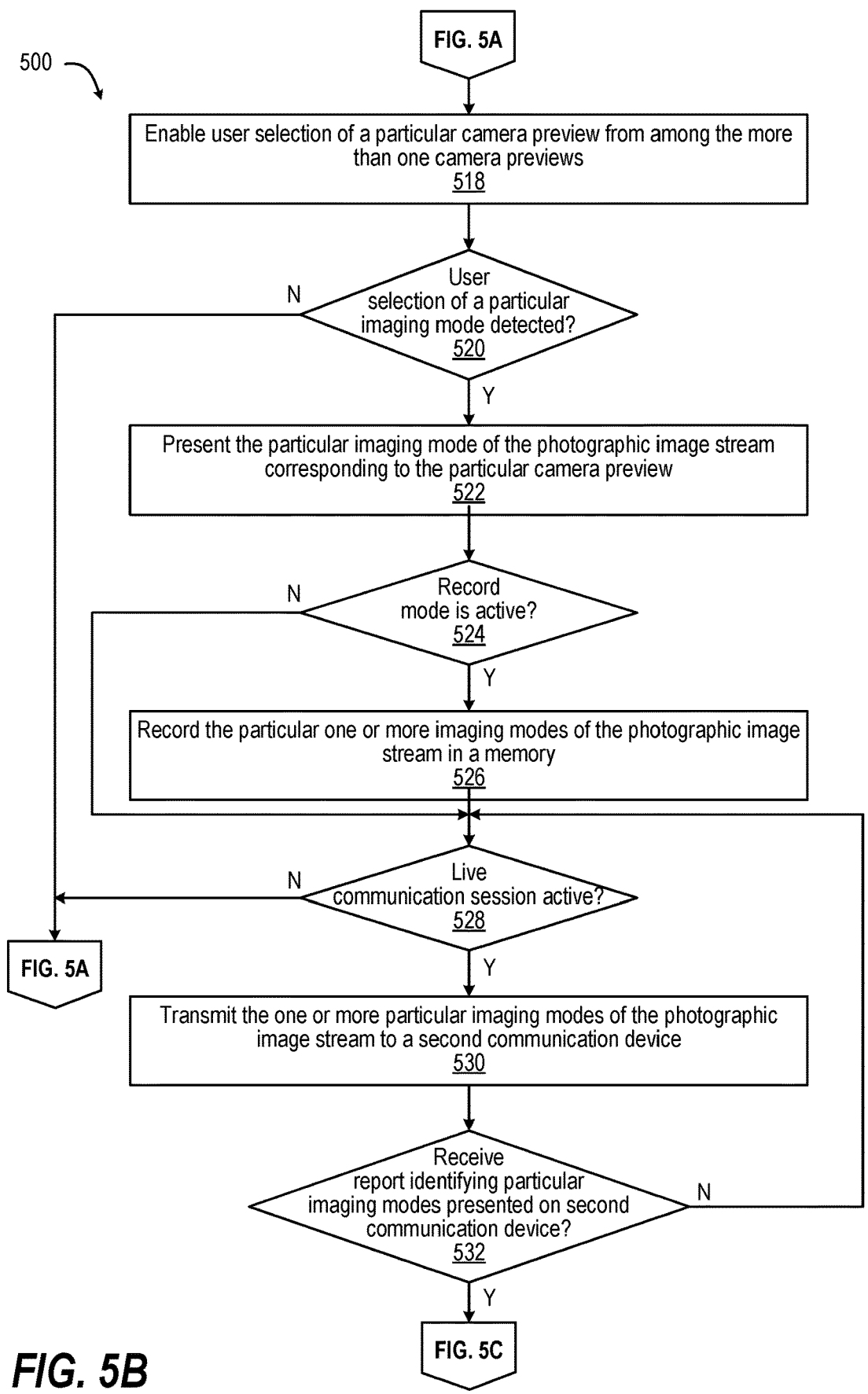
Figure 5C:
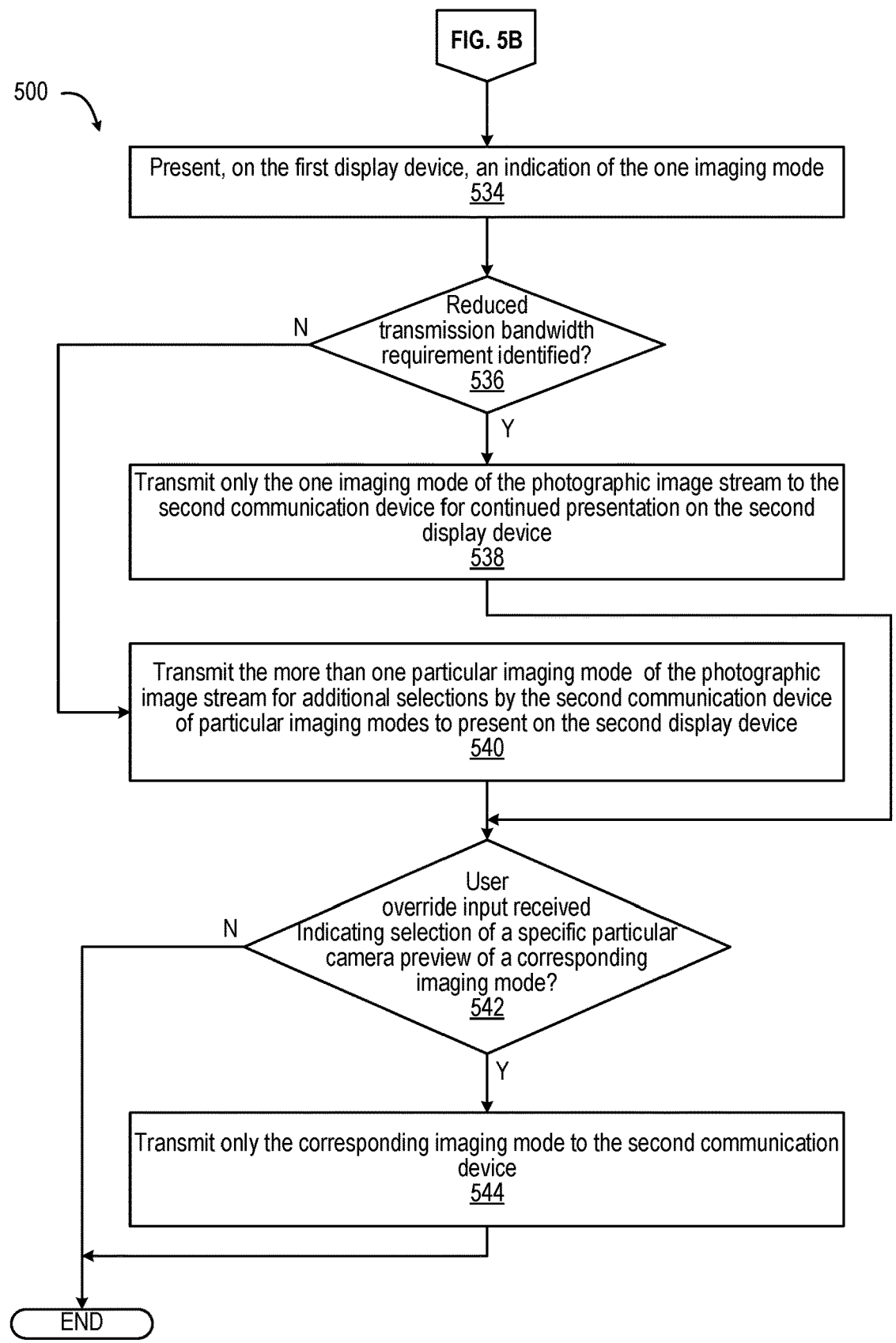

FIGS. 5A-5C (FIG. 5) present a flow diagram of method 500 for simultaneous presentation of multiple camera previews of an image stream originating at a communication device. The description of method 500 is provided with general reference to the specific components illustrated within the preceding FIGS. 1-4. In at least one embodiment, communication device 100, managed by controller 101, performs method 500 by being communicatively coupled to image capturing devices 114 and at least one of internal and external display devices 102a, 102b (FIG. 1). Controller 101 executes camera preview application 153 and image processing module 154 (FIG. 1) to provide functionality of method 500. Specific components described in method 500 can be identical or similar to specific components of the same name used to describe preceding FIGS. 1-4.

With initial reference to FIG. 5A, method 500 includes generating a photographic image stream using at least one image capturing device (block 502). Method 500 includes determining, by the controller, whether the first display device has a size that is greater than a pre-established threshold size for simultaneously displaying multiple camera previews (decision block 504). In response to determining that the size of the first display device is less than or equal to the threshold size, method 500 includes enabling sequential presentation of the more than one camera previews (block 506). One camera preview is presented at a time. Then method 500 ends. In response to determining that the size of the first display device is greater than the threshold size, method 500 includes simultaneously producing more than one camera previews of the photographic image stream in different imaging modes (block 508). Method 500 includes simultaneously presenting the more than one camera previews on the first display device (block 510).

In one or more embodiments, method 500 includes detecting, by the controller, whether the photographic image stream contains a recognized scene (decision block 512). In response to detecting a recognized scene, method 500 includes associating the recognized scene with one or more recommended imaging modes (block 514). In one or more embodiments, the controller is provisioned with pre-defined associations. In one or more embodiments, the controller learns recommended imaging modes based on manual user selections in previous uses of the communication device. Method 500 includes indicating, on the first display device, the camera previews that correspond to the recommended imaging modes (block 516). One example of this feature is recognizing a low light scene that is associated with a night imaging mode. Another example is recognizing a work scene that is associated with a professional live filter assigned to the work scene. An additional example is recognizing a posed individual scene that is associated with more than one imaging mode: (i) spot color; (ii) beauty filtering; and (iii) portrait mode. A further example is recommending an imaging format such as black and white that requires a reduced amount of communication bandwidth limitation in response to detecting a transmission limitation.

Referring now to FIG. 5B, in response to not detecting a recognized scene or after recommending the one or more imaging modes in decision block 512 or performing block 516, method 500 includes enabling user selection of a particular camera preview from among the more than one camera previews (block 518). Method 500 includes determining whether a user selection of a particular camera preview of a particular imaging mode is detected (decision block 520). In response to determining that a user selection is not detected, method 500 returns to block 508 (FIG. 5A). In response to determining that a user selection is detected, method 500 includes presenting the particular imaging mode of the photographic image stream corresponding to the selected particular camera preview (block 522). Method 500 includes determining whether recording mode is active (decision block 524). In response to determining that recording mode is active, method 500 includes recording the particular one or more imaging modes of the photographic image stream in a memory (block 526). In response to determining that recording mode is not active or after recording the particular imaging mode, method 500 includes determining whether a live communication session is active (decision block 528). FIG. 3 depicts an example communication session between first communication device 300a and second communication device 300b. In response to determining that a live communication session is not active, method 500 returns to block 508 (FIG. 5A). In response to determining that a live communication session is active, method 500 includes transmitting the one or more particular imaging modes of the photographic image stream to a second communication device (block 530). In one or more embodiments, method 500 includes determining whether a report from the second communication device is received identifying one imaging mode of the photographic image stream that is being presented on the second display device (decision block 532). In response to determining that a report from the second communication device is not received, method 500 returns to decision block 528.

In response to determining that a report from the second communication device is received, with reference to FIG. 5C, method 500 includes presenting, on the first display device, an indication of the one imaging mode that is be used by the second communication device (block 534). At decision block 536 method 500 includes determining whether a reduced transmission bandwidth requirement is identified. In response to determining that the reduced transmission bandwidth requirement is identified, method 500 includes transmitting only the one imaging mode of the photographic image stream to the second communication device for continued presentation on the second display device (block 538). In response to determining that the reduced transmission bandwidth requirement is not identified, method 500 includes transmitting the more than one particular imaging mode of the photographic image stream for additional selections by the second communication device of particular imaging modes to present on the second display device (block 540). Method 500 proceeds from either block 538 or 540 to determining whether a user override input is received indicating selection of a specific particular camera preview of a corresponding imaging mode (decision block 542). In response to not receiving the user override input, method 500 ends. In response to receiving the user override input, method 500 includes transmitting only the corresponding imaging mode to the second communication device (block 544). Then method 500 ends.

Figure 6A:
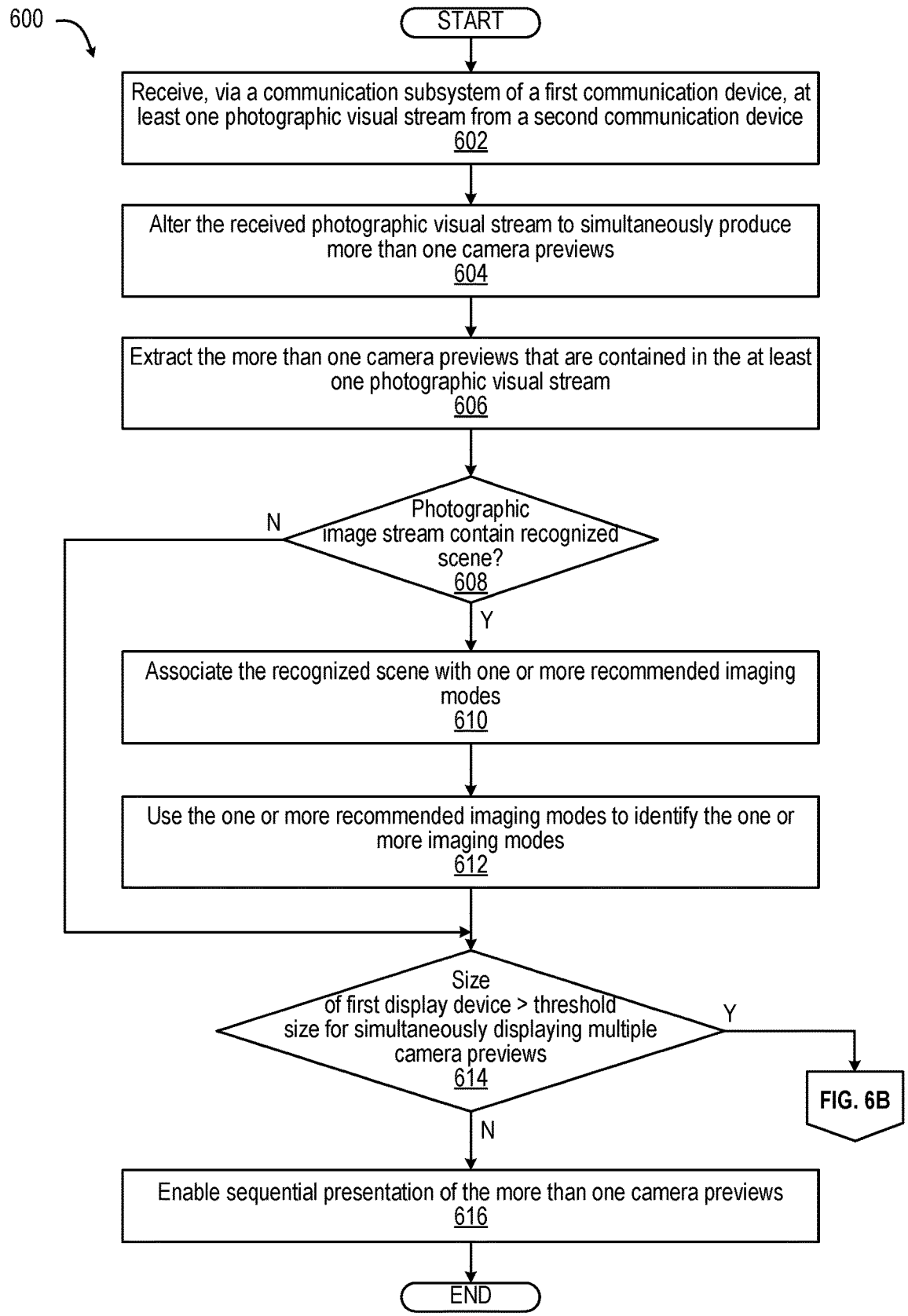
FIGS. 6A-6B (FIG. 6) present a flow diagram of a method for simultaneous presentation of multiple camera previews for presenting a received image stream, according to one or more embodiments.
Figure 6B:
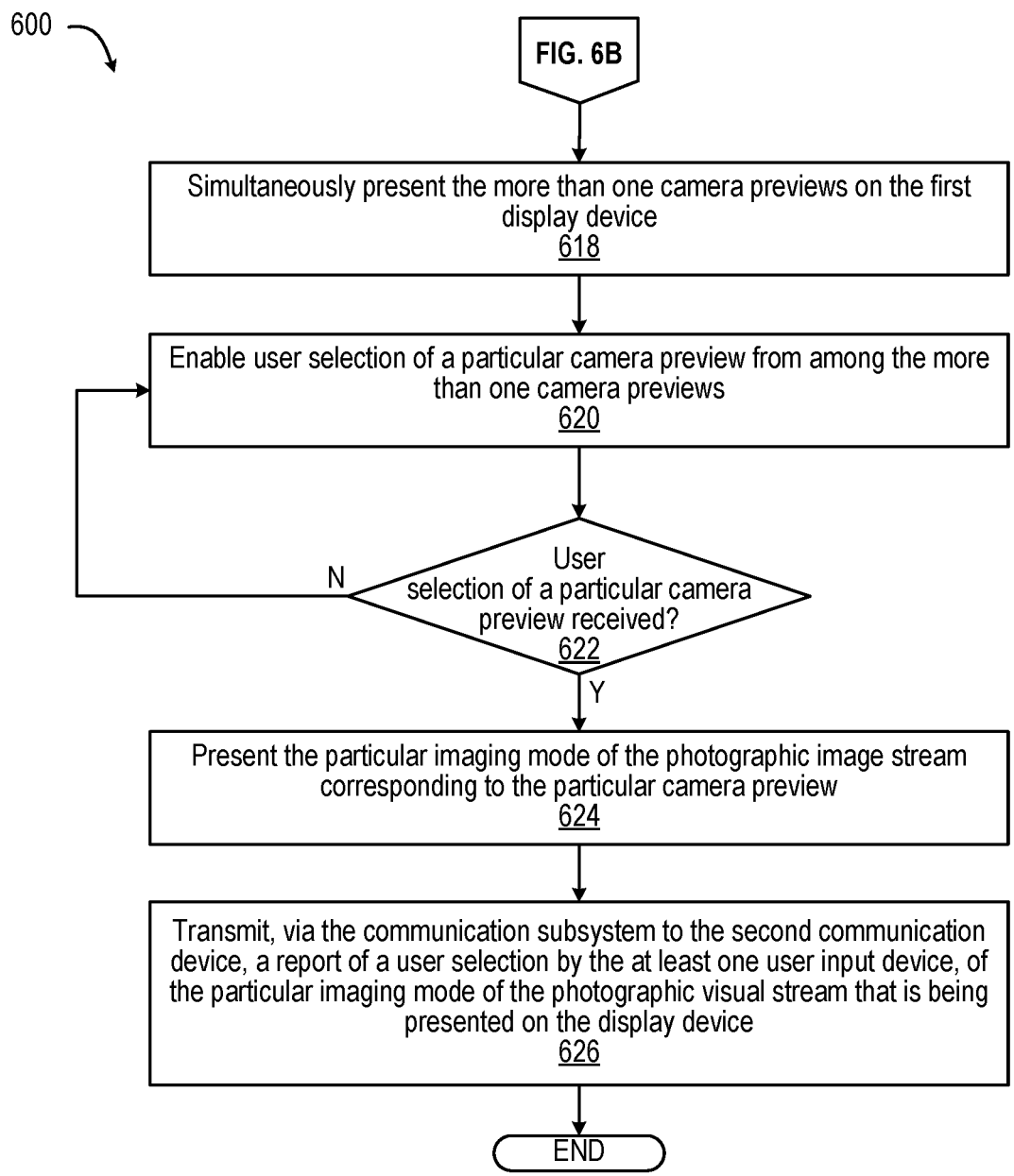

FIGS. 6A-6B (FIG. 6) present a flow diagram of method 600 for simultaneous presentation of multiple camera previews of a received image stream. The description of method 600 is provided with general reference to the specific components illustrated within the preceding FIGS. 1-4 and 5A-5C. In at least one embodiment, communication device 100, managed by controller 101, performs method 600 by being communicatively coupled to at least one of internal and external display devices 102a-102b (FIG. 1). In at least one embodiment, one or both of first and second communication devices 300a-300b (FIG. 3A) perform method 600. Controller 101 executes camera preview application 153 and image processing module 154 (FIG. 1) to provide functionality of method 600. Specific components described in method 600 can be identical or similar to specific components of the same name used to describe preceding FIGS. 1-4 and 5A-5C.

With initial reference to FIG. 6A, method 600 includes receiving, via a communication subsystem of a first communication device, at least one photographic visual stream from a second communication device (block 602). In one or more embodiments, method 600 includes altering the received photographic visual stream to simultaneously produce more than one camera previews (block 604). In one or more embodiments, method 600 includes extracting the more than one camera previews that are contained in the at least one photographic visual stream (block 606). In one or more embodiments, method 600 includes detecting whether the photographic image stream contains a recognized scene (decision block 608). In response to detecting a recognized scene, method 600 includes associating the recognized scene with one or more recommended imaging modes (block 610). Method 600 includes using the one or more recommended imaging modes to identify the one or more imaging modes (block 612). In response to not detecting a recognized scene in decision block 608 or after performing block 612, method 600 includes determining whether the first display device has a size that is greater than a pre-established threshold size for simultaneously displaying multiple camera previews (decision block 614). In response to the size of the first display device being less than or equal to the threshold size, method 600 includes enabling sequential presentation of the more than one camera previews (block 616). Then method 600 ends.

FIG. 6B depicts further features of method 600. In response to the size of the first display device being greater than the threshold size in decision block 614 (FIG. 6A), method 600 includes simultaneously presenting the more than one camera previews on the first display device (block 618). Method 600 includes enabling user selection of a particular camera preview from among the more than one camera previews (block 620). Method 600 includes determining whether a user selection of a particular camera preview is received (decision block 622). In response to not receiving of a user selection of a particular camera preview, method 600 returns to block 620. In response to receipt of a user selection of the particular camera preview, method 600 includes presenting the particular imaging mode of the photographic image stream corresponding to the particular selected camera preview (block 624). In one or more embodiments, method 600 includes transmitting, via the communication subsystem to the second communication device, a report of a user selection of the particular imaging mode of the photographic visual stream that is being presented on the display device (block 626). Then method 600 ends.

In one or more embodiments, presentation and selection of one or more multiple simultaneous camera previews is a necessary step prior to commencing recording or streaming of the photographic image stream. In one or more embodiments, if a user does not select one or more of the simultaneous camera previews during a predetermined period of time, recording or streaming of the photographic image stream commences with a default or automatically selected imaging mode. In one or more embodiments, recording or streaming of the photographic image stream is triggered before multiple simultaneous camera previews are presented for selection. In one or more embodiments, presentation of multiple simultaneous camera previews is a user selectable option that is enabled when an appropriate display size is detected. In one or more embodiments, presentation of multiple simultaneous camera previews is triggered by an application that managed recording or streaming of the photographic image stream. In one or more embodiments, the number of imaging modes that are simultaneously displayed is based on the particular size of the display device. In one or more embodiments, the groupings of multiple simultaneous camera previews are presented in a sequence that is ranked by automatically detected scene selection or based on prior user selections.

Aspects of the present innovation are described above with reference to flowchart illustrations and/or block diagrams of methods, apparatus (systems) and computer program products according to embodiments of the innovation. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

As will be appreciated by one skilled in the art, embodiments of the present innovation may be embodied as a system, device, and/or method. Accordingly, embodiments of the present innovation may take the form of an entirely hardware embodiment or an embodiment combining software and hardware embodiments that may all generally be referred to herein as a "circuit," "module" or "system."

While the innovation has been described with reference to embodiments, it will be understood by those skilled in the art that various changes may be made, and equivalents may be substituted for elements thereof without departing from the scope of the innovation. In addition, many modifications may be made to adapt a particular system, device, or component thereof to the teachings of the innovation without departing from the essential scope thereof. Therefore, it is intended that the innovation not be limited to the particular embodiments disclosed for carrying out this innovation, but that the innovation will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the innovation. As used herein, the singular forms "a", "an" and "the" are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present innovation has been presented for purposes of illustration and description but is not intended to be exhaustive or limited to the innovation in the form disclosed. Many modifications and variations will be apparent to those of ordinary skill in the art without departing from the scope and spirit of the innovation. The embodiments were chosen and described in order to best explain the principles of the innovation and the practical application, and to enable others of ordinary skill in the art to understand the innovation for various embodiments with various modifications as are suited to the particular use contemplated.

What is claimed is:

1. A communication device comprising:
   at least one user input device;
   a communication subsystem;
   a display driver;
   a controller that is communicatively coupled to the at least one user input device, the communication subsystem, the display driver, and a display device, and which:
      receives, via the communication subsystem from a second communication device, more than one imaging modes of a photographic visual stream, the more than one imaging modes corresponding to more than one camera previews of a single image captured by a camera of the second communication device, the more than one camera previews generated by processing the single image at the second communication device based on different imaging modes prior to commencing transmitting by the second communication device of each of the more than one imaging modes of the photographic visual stream to the communication device;
      in response to receiving the more than one imaging modes of the photographic visual stream corresponding to the more than one camera previews from the second communication device, simultaneously presents, via the display driver on the display device, the more than one camera previews corresponding to the more than one imaging modes of the photographic visual stream; and
      in response to receiving a user selection of a particular imaging mode from among the more than one imaging modes:
         transmits, via the communication subsystem to the second communication device, a report triggering the second communication device to transmit only the particular imaging mode selected by the user; and
         subsequently receives only the particular imaging mode as the photographic visual stream from the second communication device, in response to transmitting the report and the second communication device identifying a reduced transmission bandwidth requirement.

2. The communication device of claim 1, wherein the controller:
   enables user selection of a particular camera preview from among the more than one camera previews;
   in response to receipt of a user selection of the particular camera preview, presents a particular imaging mode of the photographic image stream corresponding to the particular camera preview.

3. The communication device of claim 1, wherein:
   the controller is a component within a mobile device;
   the display device is an external display device; and
   the controller simultaneously presents the more than one camera previews on the display device in response to determining that both: (i) the mobile device is stationary; and (ii) the display device has a size greater than a threshold size pre-established for simultaneously presenting more than one camera previews.

4. The communication device of claim 1, wherein the controller:
   determines whether the display device has a size that is greater than a pre-established threshold size for simultaneously displaying multiple camera previews;
   initiates the simultaneous presenting of the more than one camera previews in response to the size of the display device being greater than the pre-established threshold size; and
   enables only sequential, one at a time, presentation of the more than one camera previews in response to the size of the display device not being greater than the pre-established threshold size.

5. The communication device of claim 1, further comprising an image processing component that receives the photographic visual stream and alters the photographic visual stream to simultaneously produce the more than one camera previews.

6. The communication device of claim 5, wherein:
   the image processing component detects whether the photographic image stream contains a recognized scene; and
   in response to detecting the recognized scene, the controller:
      associates the recognized scene with one or more recommended imaging modes; and
      presents the one or camera previews using the one or more recommended imaging modes.

7. The communication device of claim 1, wherein the more than one camera previews are contained in the photographic visual stream received from the second communication device.

8. A method comprising:
   receiving, via a communication subsystem of a first communication device from a second communication device, more than one imaging modes of a photographic visual stream, the more than one imaging modes corresponding to more than one camera previews of a single image captured by a camera of the second communication device, the more than one camera previews generated by processing the single image at the second communication device based on different imaging modes prior to commencing transmitting by the second communication device of each of the more than one imaging modes of the photographic visual stream to the first communication device;
   in response to receiving the more than one imaging modes of the photographic visual stream corresponding to the more than one camera previews from the second communication device, simultaneously presenting on a display device of the first communication device the more than one camera previews corresponding to the more than one imaging modes of the photographic visual stream; and
   in response to receiving a user selection of a particular imaging mode from among the more than one imaging modes:
      transmitting, via the communication subsystem to the second communication device, a report triggering the second communication device to transmit only the particular imaging mode selected by the user; and
      subsequently receiving only the particular imaging mode as the photographic visual stream from the second communication device, in response to transmitting the report and the second communication device identifying a reduced transmission bandwidth requirement.

9. The method of claim 8, further comprising:
   enabling user selection of a particular camera preview from among the more than one camera previews; and in response to receipt of a user selection of the particular camera preview, presenting a particular imaging mode of the photographic image stream corresponding to the particular camera preview.

10. The method of claim 9, further comprising simultaneously presenting the more than one camera previews on the display device in response to determining that both: (i) at least one image capturing device of the first communication device is stationary; and (ii) the display device has a size greater than a threshold size pre-established for simultaneously presenting more than one camera previews.

11. The method of claim 9, further comprising:
determining whether the display device has a size that is greater than a pre-established threshold size for simultaneously displaying multiple camera previews;
initiating the simultaneous presenting of the more than one camera previews in response to the size of the first display device being greater than the pre-established threshold size; and
enabling only sequential, one at a time presentation of the more than one camera previews in response to the size of the first display device not being greater than the threshold size.

12. The method of claim 8, further comprising:
receiving the photographic visual stream; and
altering the photographic visual stream to simultaneously produce the more than one camera previews.

13. The method of claim 8, further comprising
detecting whether the photographic image stream contains a recognized scene; and
in response to detecting a recognized scene:
associating the recognized scene with one or more recommended imaging modes; and
presenting the one or camera previews using the one or more recommended imaging modes.

14. The method of claim 8, further comprising:
receiving the photographic image stream from the second communication device; and
extracting the more than one camera previews that are contained in the photographic visual stream.

15. A computer program product comprising:
a non-transitory computer readable storage device; and
program code on the computer readable storage device that when executed by a processor associated with a first communication device, the program code enables the first communication device to provide the functionality of:
receiving, via a communication subsystem of a first communication device from a second communication device, more than one imaging modes of a photographic visual stream, the more than one imaging modes corresponding to more than one camera previews of a single image captured by a camera of the second communication device, the more than one camera previews generated by processing the single image at the second communication device based on different imaging modes prior to commencing transmitting by the second communication device of each of the more than one imaging modes of the photographic visual stream to the first communication device; and
in response to receiving the more than one imaging modes of the photographic visual stream corresponding to the more than one camera previews from the second communication device, simultaneously presenting on a display device of the first communication device the more than one camera previews corresponding to the more than one imaging modes of the photographic visual stream; and
in response to receiving a user selection of a particular imaging mode from among the more than one imaging modes:
transmitting, via the communication subsystem to the second communication device, a report triggering the second communication device to transmit only the particular imaging mode selected by the user; and
subsequently receiving only the particular imaging mode as the photographic visual stream from the second communication device in response to transmitting the report and the second communication device identifying a reduced transmission bandwidth requirement.

16. The computer program product of claim 15, wherein the program code enables the first communication device to provide the functionality of:
enabling user selection of a particular camera preview from among the more than one camera previews; and
in response to receipt of a user selection of the particular camera preview, presenting a particular imaging mode of the photographic image stream corresponding to the particular camera preview.

17. The computer program product of claim 15, wherein the program code enables the first communication device to provide the functionality of:
simultaneously presenting the more than one camera previews on the display device in response to determining that both: (i) the communication device is stationary; and (ii) the display device has a size greater than a threshold size.

* * * * *